May 10, 1927.
H. P. GROSSMAN
1,628,461
CORN SHREDDER AND HUSKER
Filed Feb. 18, 1927
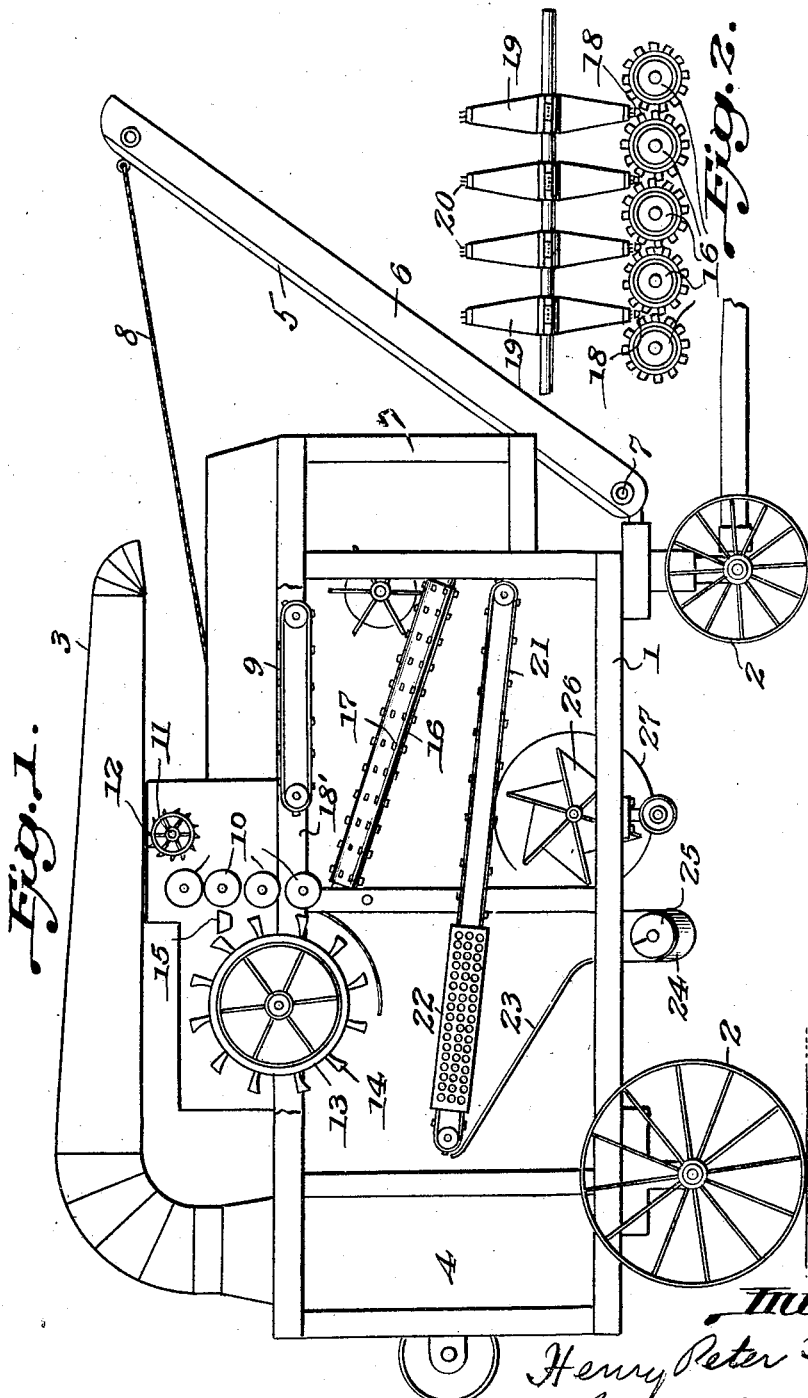

Patented May 10, 1927.

1,628,461

UNITED STATES PATENT OFFICE.

HERMAN PETER GROSSMAN, OF BOONVILLE, INDIANA.

CORN SHREDDER AND HUSKER.

Application filed February 18, 1927. Serial No. 169,301.

This invention relates to machines for shredding and husking corn.

The object of the invention is to provide a machine of this character which will be provided with improved means for severing the ears from the stalks, feeding the stalks and leaves to the shredder, and preventing clogging during the feeding operation; husking or shucking the ears by improved means which will insure that no ears which have failed to be shucked shall pass to the final delivering conveyor; also, to provide an improved arrangement of conveyor and screen for collecting any corn which has been shelled; and to provide a booster fan arranged in novel relationship to the usual stacking fan and to the lower part of the machine whereby it will boost or supplement the action of the main fan and will also keep the lower part of the machine free from refuse.

Other objects of the invention will appear from the following description; the novel features and combinations are set forth in the appended claims.

In the accompanying drawings:

Figure 1, is a side elevation of the complete machine, certain parts being broken away, and the different drives being omitted for the sake of clearness; and Fig. 2, is a front elevation of the improved shucking or husking rollers and drum.

The frame of the machine appears at 1, being supported by the usual wheels 2. The stack is shown at 3 and the ordinary stacking fan, not shown, is contained within the chamber 4.

The final or delivering apron or conveyor which takes off the husked ears is shown at 5, being carried by a suitable frame 6 pivoted at 7 and adapted to be raised and lowered by a cable 8, operated in any suitable manner. The operator stands on a platform carried by the frame 1 and throws or places the corn on the endless apron or conveyor 9 which delivers the corn to the severing rollers 10. The rollers 10 are ribbed or corrugated in any suitable manner in the direction of their length so that they will firmly grasp the corn stalks and squeeze off the severed ears, the latter, however, being still encased in their husks or shucks.

To prevent clogging or congestion of the corn being fed by the apron 9 to the rollers 10, there is provided a shaft 11 which may carry as many toothed wheels 12 as may be necessary to agitate the mass of corn so that it will be properly fed to the rollers 10.

Located to the rear of the rollers 10 is the shredding or cutting drum or cylinder 13 which has the usual knives 14 and revolves at a high rate of speed. The stalks and leaves are cut up and shredded by the drum 13.

There is provided a bar or divider 15 between the roller 10 and the drum 13. This bar causes the stalks to pass over it and it splits up the streams so that the leaves and stalks are thoroughly cut up. The shredded stalks and leaves are sucked by the fan 4 and blown through the stack 3 to be deposited at one side of the machine, in the usual manner.

Located below the conveyor 9 are inclined husking or shucking rollers 16 which have teeth 17. There is a space 18' provided between the apron 9 and the rollers 10 through which the ears that have been squeezed off by the rollers 10 fall, passing on to the husking rollers 16.

To prevent the husking rollers from tearing up the ears, there is provided between adjacent rollers 16 the separators 18 running lengthwise of the rollers.

To prevent the ears from passing from the husking rollers 16 before the husks or shucks have been removed, there is provided a drum consisting of blades 19 provided with teeth 20, said blades being adapted to rotate above the separator strips 8. The drum beats back the ears so that they will be subject to the teeth 17 for a sufficient length of time to insure removal of the husks.

The husked ears pass on to the delivering apron 5.

Located below the husking rollers 16 is an apron or conveyor 21 whose purpose is to carry rearwardly any shelled corn which may have been removed from the ears by the rollers 16. The apron passes through a screen 22. The shelled corn finally reaches the chute 23 which directs it to a trough 24 of the screen or conveyor 25 that feeds it laterally to the end of the trough, whence it is collected in a suitable sack.

Located beneath the apron 21 is a booster fan 26 operating in a shell 27 and being adapted to blow rearwardly of the machine. This fan not only clears the lower part of the machine of refuse but it also supplements the action of the fan contained within the casing 4 and assists in carrying off the shredded stalks and the husks.

What I claim is:

1. In a corn shredder and husker, the combination with rollers for severing the stalks from the ears, and a shredder, of means for dividing the stalks while passing from the rollers to the shredder.

2. In a corn shredder and husker, the combination with rollers for severing the stalks from the ears, and a shredder, of means for dividing the stalks while passing from the rollers to the shredder, comprising a bar past which the stalks are fed by the rollers.

3. In a corn shredder and husker, the combination with rollers for severing stalks from the ears, of a shredder for acting on the severed stalks, means for feeding the corn to said rollers, and a rotary agitator and feed booster arranged to act on the corn being fed to the rollers.

4. In a corn shredder and husker, the combination with rotary toothed husking rollers, of separator or guard strips located between the adjacent rollers, and means operating above and close to the guard strips in the region of the delivery ends of said rollers for beating back the ears while on the husking rollers.

5. In a corn shredder and husker, the combination with rotary toothed husking rollers, of separator or guard strips located between the adjacent rollers, and rotarily mounted beating blades operating over the respective separator or guard strips in the region of the delivery ends of said rollers and adapted to beat back the ears on the rollers.

6. In a corn shredder and husker, the combination with rollers for severing the ears from the stalks, a shredder, and husking rollers, of an endless conveyor located beneath the shredder and the husker, a stacking fan, and a booster fan, said conveyor catching the shredded material and also the droppings from the husker, said booster fan assisting in the stacking of the refuse and shredded material, a screen under which the endless conveyor passes, and means under the screen for collecting the shelled corn which may be dropped.

In testimony whereof I affix my signature.

HERMAN PETER GROSSMAN.